United States Patent [19]
Hubscher

[11] Patent Number: 5,988,294
[45] Date of Patent: Nov. 23, 1999

[54] CULTIVATOR

[76] Inventor: Darin Hubscher, R.R.#2, Swan River, Canada, R0L 1Z0

[21] Appl. No.: 08/986,391

[22] Filed: Dec. 9, 1997

[51] Int. Cl.⁶ .................................................. A01B 63/12
[52] U.S. Cl. ......................... 172/453; 172/668; 172/687; 172/142; 172/150
[58] Field of Search .................................... 172/453, 668, 172/684.5, 677, 685, 687, 142, 150, 246; 37/231; 230/239 A

[56] References Cited

U.S. PATENT DOCUMENTS

| | | | |
|---|---|---|---|
| 2,189,962 | 2/1940 | Rae et al. .............................. | 172/150 X |
| 2,545,265 | 3/1951 | Dewey .................................... | 172/150 |
| 3,232,358 | 2/1966 | Heiberg ................................. | 172/677 X |
| 3,912,019 | 10/1975 | Baughman et al. ................. | 172/142 X |
| 4,029,155 | 6/1977 | Blair et al. ........................... | 172/142 X |
| 4,250,970 | 2/1981 | Pfenninger et al. ................... | 172/142 |
| 4,648,617 | 3/1987 | Hannappel ........................... | 280/289 A |
| 4,725,068 | 2/1988 | Taylor et al. ........................ | 172/677 X |
| 4,770,595 | 9/1988 | Thompson et al. .................. | 172/453 X |
| 4,790,085 | 12/1988 | Rossman ................................... | 37/231 |
| 4,897,013 | 1/1990 | Thompson et al. .................. | 172/453 X |
| 4,903,782 | 2/1990 | McClellan ............................ | 172/799.5 |
| 4,946,113 | 8/1990 | Riffle et al. ......................... | 242/86.5 R |
| 5,535,832 | 7/1996 | Benoit ................................. | 172/799.5 X |
| 5,746,275 | 5/1998 | Cross et al. ............................. | 172/440 |
| 5,809,672 | 9/1998 | Jones ...................................... | 37/231 X |
| 5,829,536 | 11/1998 | Pigg et al. .............................. | 172/482 |

*Primary Examiner*—Victor Batson
*Attorney, Agent, or Firm*—Adrian D. Battison; Murray E. Thrift

[57] ABSTRACT

A cultivator for towing by an ATV comprises a cultivator frame including a plurality of horizontal parallel tool bars and a pair of side rails interconnecting the tool bars to hold the tool bars at right angles to a direction of forward movement of the frame. The middle tool bar is of a length to extend only between the rails. The front tool bar is of intermediate length and extends beyond the rails to leave free ends. The rear tool bar is longest. Each tool bar carries a plurality of S-tines. A pair of ground wheels is mounted on a cross-shaft of the frame at the front tool bar for pivotal movement relative to the frame and including an actuation lever operable by an electric actuator for raising a height of the frame relative to the ground. A hitch pole is connected to the frame by a pair of collars under the front tool bar and the middle tool bar and extends forwardly therefrom to a hitch connection for connecting to the vehicle. Various accessories can be attached to the base frame including a pair of extension arms a disker, a harrow bar, a roller, a wire reel, a potato digger, a potato hiller and a land leveller blade.

15 Claims, 7 Drawing Sheets

CULTIVATOR

This invention relates to a narrow width or small size cultivator device which can be pulled by an ATV type vehicle or yard type tractor and which has the capability for attachment of a number of conversion components for providing a series of available end uses for the device.

BACKGROUND OF THE INVENTION

Yard work or small scale cultivation often requires the use of narrow width equipment to be pulled by smaller vehicles such as particularly the ATV which has developed a wide market in recent years. For this purpose, specialised designs have been developed for pull-type mowers, blades and other equipment for use with the ATV. However no cultivator has been proposed which provides an effective, simple and inexpensive design for attachment to the ATV.

SUMMARY OF THE INVENTION

It is one object of the present invention, therefore to provide a cultivator designed specifically for attachment to a light towing vehicle such as an ATV.

According to one aspect of the invention there is provided a cultivator for towing by a light vehicle such as an ATV comprising:

a cultivator frame including a plurality of horizontal parallel tool bars and a pair of rails interconnecting the tool bars to hold the tool bars at right angels to a direction of forward movement of the frame;

each tool bar having mounted thereon a plurality of shanks each for carrying a ground working tool;

a pair of ground wheels mounted on the frame for carrying the frame in movement across the ground;

the ground wheels being mounted on a support member for pivotal movement relative to the frame and including an actuation lever operable for raising a height of the frame relative to the ground;

a hitch pole connected to the frame and extending forwardly therefrom to a hitch connection for connecting to the vehicle;

and an electric actuator for receiving electric power from the vehicle for operating said lever.

Preferably the hitch pole is readily releasably and re-engageably connected to the frame.

Preferably the frame includes a first collar through which the hitch pole slides and a second collar into which the hitch pole engages, the hitch pole being connected to at least one of the collars by a connection pin.

Preferably the first collar is mounted on a bottom surface of a front one of the tool bars and the second collar is mounted on a bottom surface of an intermediate one of the tool bars.

Preferably the support member for the ground wheels is mounted on a front one of the tool bars and includes a common mounting shaft with the lever extending from the common mounting shaft, the actuator being mounted on an intermediate one of the tool bars and extending therefrom to the lever, Preferably the common mounting shaft is carried in bearings mounted on top of the front tool bar.

Preferably the intermediate one of the tool bars is of a shortest length and is located between the rails, wherein the front one of the tool bars is of an intermediate length and the ground wheels are located at a position just outside the ends of the front tool bar and wherein a rear one of the tool bars is of the longest length.

Preferably the rear tool bar has ends thereof projecting outwardly from the rails to the sides for receiving thereon an attachment collar of an accessory.

Preferably there is provided a pair of wire support members for dispensing wire from the frame, each wire support member comprising a horizontal support plate, a vertical post standing upwardly from the plate and an attachment collar mounted underneath the plate with an open mouth facing horizontally for engaging onto a respective end of the tool bar.

Preferably there is provided a ground roller for rolling over the ground behind the rear tool bar, the roller having a pair of towing arms each at a respective end of the roller and extending forwardly therefrom, each towing arm having a collar at a forward end thereof with an open mouth facing to one side of the arm for engaging onto a respective end of the tool bar.

Preferably there is provided a harrow bar mounted on the frame so as to be carried rearwardly of a rear one of the tool bars, the harrow bar comprising a horizontal support bar having a plurality of harrow tines extending downwardly therefrom, a pair of support arms extending upwardly and forwardly from the support bar, each arm being pivotally connected to a top of a respective support post mounted on the frame, and a spring biasing assembly providing downward spring force on the arms, the spring biasing assembly comprising a pair of pins attached to the rear tool bar and extending upwardly therefrom, the pins being curved about a pivot axis at the top of the posts and each pin carrying a spring having an upper end engaging a removable stop and a lower end engaging the respective arm.

Preferably there is provided a pair of extension arms, each having a shank thereon at an outer end thereof and each having a clamping assembly at an inner end thereof arranged for attachment to an outer side of a respective one of the rails at the end of an intermediate one of the tool bars so as to define an extension of the intermediate tool bar outwardly of the respective rail.

Preferably there is provided a scraper blade having a bottom blade portion defining a substantially horizontal blade edge and a rear containment portion connected to and extending upwardly from the blade portion, the blade portion being arranged for attachment to at least two of the shanks of a rear one of the tool bars, in replacement for the ground working tools thereof, for movement thereby across the ground rearwardly of the shanks of a forward one of the tool bars.

Preferably the blade portion is arranged at an angle matching that of a lower portion of the shanks of the rear tool bar and includes bolt holes therein for receiving shank bolts from the shanks.

Preferably there is provided a disker attachment for the cultivator, the disker attachment including a longitudinal receptacle portion, a front pair of disk support arms mounted on and extending outwardly from the receptacle portion and a rear pair of disk support arms mounted on and extending outwardly from the receptacle portion, the receptacle portion being arranged to receive the hitch pole therein.

Preferably the receptacle portion includes a collar thereon into which the hitch pole can slide.

Preferably the frame includes a first collar through which the hitch pole slides and a second collar into which the hitch pole engages, the hitch pole being connected to at least one of the collars by a connection pin and wherein the collar of the receptacle portion slide onto the hitch pole forwardly of the first collar.

Preferably there is provided a hiller attachment comprising a pair of plate members arranged for attachment to the shanks of a forward one of the tool bars and to the shanks of a rear ward one of the tool bars so as to be carried thereby at an angle to a forward direction.

Preferably there is provided a potato digger attachment comprising a transverse plate arranged to be attached across two shanks of one of the tool bars so as to lie at right angles to a forward direction and a plurality of separator bars mounted on the plate and diverging rearwardly and outwardly therefrom.

According to a second aspect of the invention there is provided a cultivator for towing by a light vehicle such as an ATV comprising:

a cultivator frame including a plurality of horizontal parallel tool bars and a pair of rails interconnecting the tool bars to hold the tool bars at right angels to a direction of forward movement of the frame;

each tool bar having mounted thereon a plurality of shanks each for carrying a ground working tool;

a pair of ground wheels mounted on the frame for carrying the frame in movement across the ground;

the ground wheels being mounted on a support member for pivotal movement relative to the frame and including an actuation lever operable for raising a height of the frame relative to the ground;

a hitch pole connected to the frame and extending forwardly therefrom to a hitch connection for connecting to the vehicle;

wherein the frame includes a first collar mounted on a bottom of a front one of the tool bars through which the hitch pole slides and a second collar mounted on a bottom surface of an intermediate one of the tool bars into which the hitch pole engages, the hitch pole being connected to at least one of the collars by a connection pin.

According to a third aspect of the invention there is provided a cultivator for towing by a light vehicle such as an ATV comprising:

a cultivator frame including a plurality of horizontal parallel tool bars and a pair of rails interconnecting the tool bars to hold the tool bars at right angels to a direction of forward movement of the frame;

each tool bar having mounted thereon a plurality of shanks each for carrying a ground working tool;

a pair of ground wheels mounted on the frame for carrying the frame in movement across the ground;

the ground wheels being mounted on a support member for pivotal movement relative to the frame and including an actuation lever operable for raising a height of the frame relative to the ground;

a hitch pole connected to the frame and extending forwardly therefrom to a hitch connection for connecting to the vehicle;

and a harrow bar mounted on the frame so as to be carried rearwardly of a rear one of the tool bars, the harrow bar comprising a horizontal support bar having a plurality of harrow tines extending downwardly therefrom, a pair of support arms extending upwardly and forwardly from the support bar, each arm being pivotally connected to a top of a respective support post mounted on the frame, and a spring biasing assembly providing downward spring force on the arms, the spring biasing assembly comprising a pair of pins attached to the rear tool bar and extending upwardly therefrom, the pins being curved about a pivot axis at the top of the posts and each pin carrying a spring having an upper end engaging a removable stop and a lower end engaging the respective arm.

According to a fourth aspect of the invention there is provided a cultivator for towing by a light vehicle such as an ATV comprising:

a cultivator frame including a plurality of horizontal parallel tool bars and a pair of rails interconnecting the tool bars to hold the tool bars at right angels to a direction of forward movement of the frame;

each tool bar having mounted thereon a plurality of shanks each for carrying a ground working tool;

a pair of ground wheels mounted on the frame for carrying the frame in movement across the ground;

the ground wheels being mounted on a support member for pivotal movement relative to the frame and including an actuation lever operable for raising a height of the frame relative to the ground;

a hitch pole connected to the frame and extending forwardly therefrom to a hitch connection for connecting to the vehicle;

wherein a rear tool one of the tool bar has ends thereof projecting outwardly from the rails to the sides for receiving thereon an attachment collar of an accessory

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
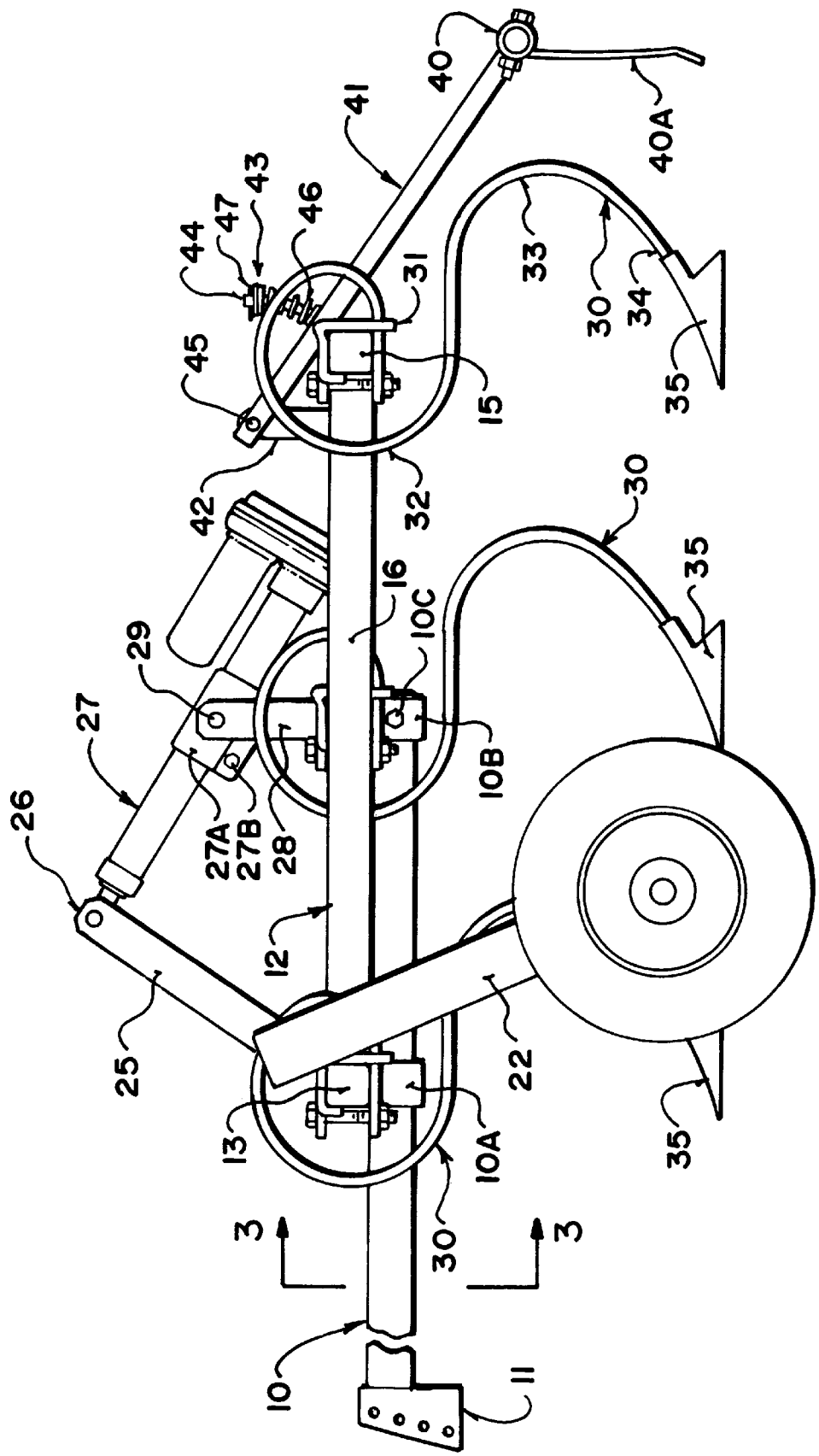
FIG. 1 is a side elevational view of a cultivator according to the present invention.
Figure 2:
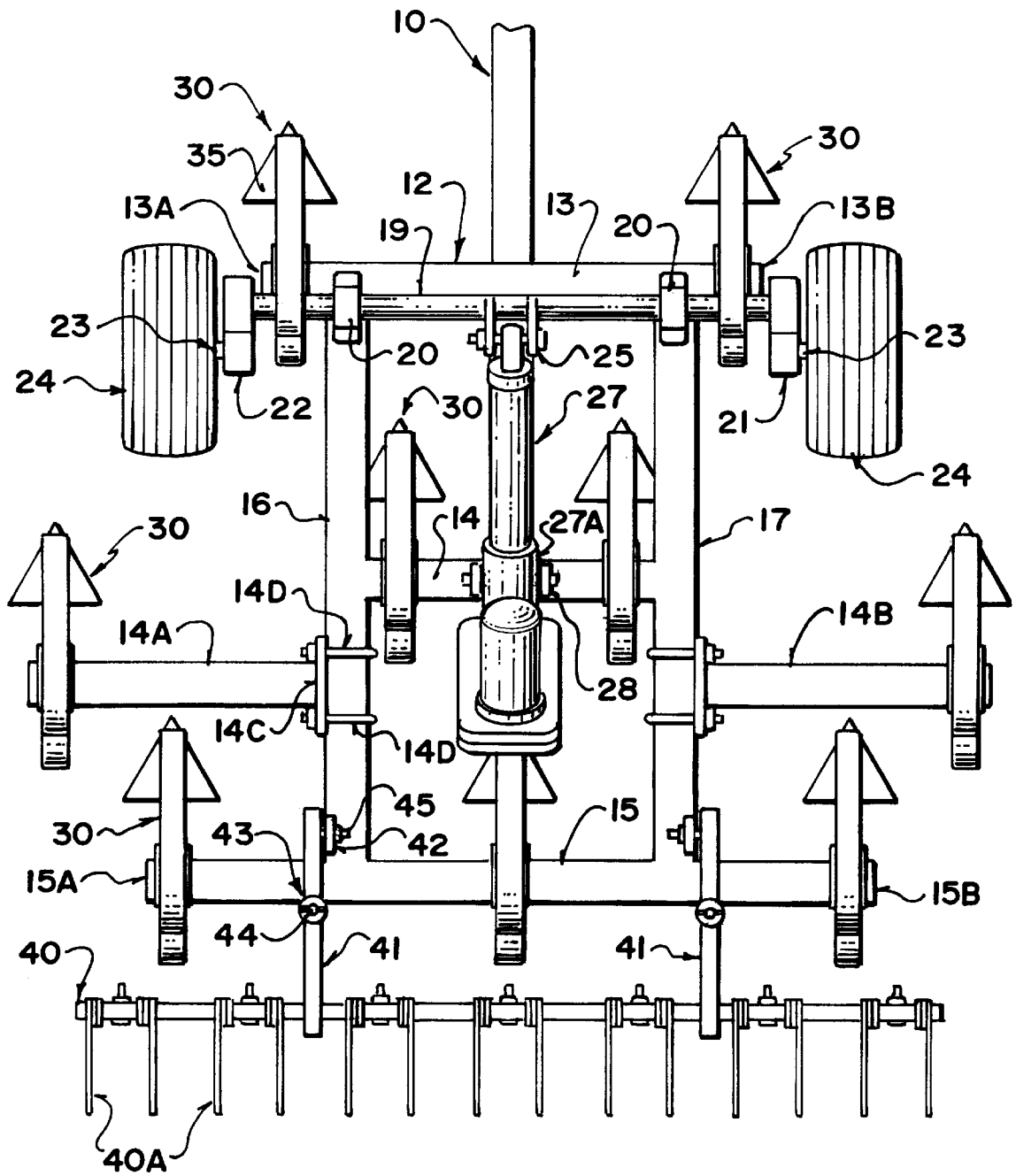
FIG. 2 is a top plan view of the cultivator of FIG. 1.
Figure 3:
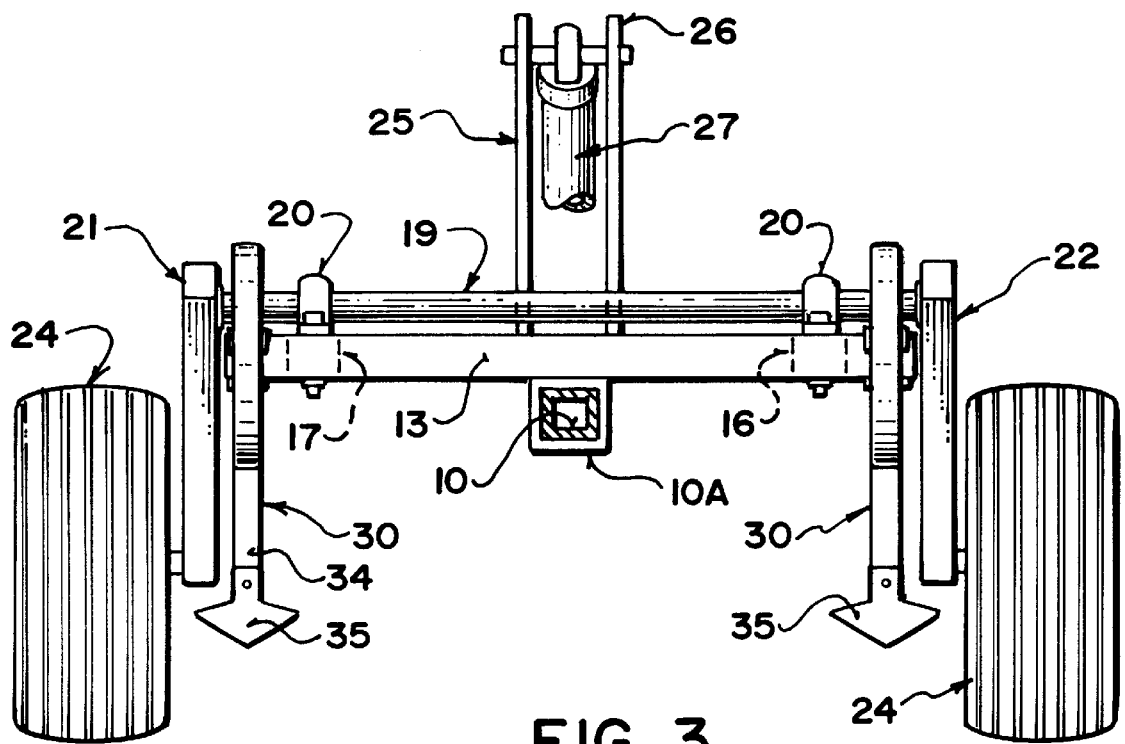
FIG. 3 is a front elevational view of the cultivator of FIG. 1.

The cultivator shown in FIGS. 1, 2 and 3 comprises a hitch pole 10 having in a forward end a coupling 11 for attachment to the hitch of an ATV type vehicle or a yard tractor. The coupling has a series of holes allowing the hitch pole to be attached at a required height. The hitch pole is in the form of a square tube which is a simple straight tube with a transverse hole at a rear end for connection to the remainder of the cultivator.

The cultivator further comprises a frame 12 having a front transverse tool bar 13, an intermediate or middle transverse tool bar 14 and a rear transverse tool bar 15. The tool bars are interconnected by a pair of parallel rails 16 and 17 at right angles to the tool bars. The rails 16 and 17 are spaced apart on either side of a center line of the cultivator at which the hitch pole 10 is located. The length of the intermediate tool bar 14 is equal to the spacing between the two rails so that the tool bar is welded across between the two rails and does not extend on either side of the rails. The front bar 13 is welded to the ends of the rails 16 and 17 and projects outwardly beyond the rails to free open ends 13A and 13B. The rear bar 15 also is welded to the ends of the rail 16 and 17 and projects outwardly beyond those rails to free ends 15A and 15B.

Underneath the front tool bar 13 is provided a collar 10A in the form of a square tube having an inside shape matching the outside surface of the hitch pole 10 so that the hitch pole can slide into the collar 10A and thus hold the hitch pole in place underneath the front tool bar 13. A second similar collar 10B is located under the middle tool bar 14 and the rear end of the hitch pole is attached to the collar 10B by a transverse pin 10C passing through the collar and through aligned holes in the rear of the hitch pole. Thus the frame is rigidly attached to the hitch pole for forward movement therewith.

A horizontal cross shaft 19 extends across the frame mounted in pillow block bearings 20 carried on top of the front tool bar 13 and the rail 16 and 17. The cross shaft 19 extends outwardly beyond the front tool bar 13 and carries on its ends a pair of depending arms 21 and 22 which are attached to the shaft for rotation therewith about a longitudinal axis of the shaft in the bearings 20. Each arm carries at its lower end a hub 23 of a ground wheel 24. The shaft 19 is attached to a lever 25 which extends upwardly and rearwardly to an upper end 26 at which is attached the forward end of an electric actuator 27. The electric actuator is mounted in a stansion 28 carried on the middle bar 14. The electric actuator is carried on a sleeve 27A, which can be loosened by bolts 27B. This allows the electric actuator 27 to further extend to a different range of movement, particularly when the an accessory is attached where the height of the frame may be required to move through a different range to raise and lower the accessory to operating and raised positions. The sleeve is mounted on a pivot pin 29 allowing the electric actuator 27 to pivot while actuating forward and rearward movement of the upper end of the lever 25 in an arc around the shaft 19. This movement causes pivotal of the wheels about the axis of the shaft so as to raise and lower the wheels relative to the frame 12.

The electric actuator is provided since this can be actuated by electric power from the tractor. Particularly when used with an ATV, an electric actuator can use the battery power from the ATV and does not require any hydraulic supply which is generally not available on an ATV system. As an alternative, however, the movement of the lever can be effected by a hand crank system in the form of a jack between the stansion 28 and the lever 25.

The wheels 24 are mounted outside the ends 13A and 13B of the front tool bar so that they can pivot forwardly and rearwardly in that area outside the front toolbar and in front of the middle toolbar.

The frame carries a plurality of S tines 30 of a conventional construction. Each S tine has a clamp member 31 which can be clamped onto the tool bar at a selected location along the length of the tool bar. From the clamp, the S tine extends rearwardly in a generally horizontal direction and then curves upwardly around the clamp and the tool bar in an upper section 32 following which the S tine curves downwardly and rearwardly as indicated at 33 to a forward lower end 34 which carries a conventional sweep 35.

As best shown in FIG. 2, the middle tool bar 14 carries S tines 30 at positions thereon immediately adjacent the rail 16 and 17 respectively. The front tool bar 13 carries two S tines each arranged at a position immediately adjacent a respective one of the ends 13A, 13B. The rear toolbar carries a centre S tine directly on the centre line of the frame and two further S tines each at a respective one of the ends 15A, 15B, the lengths are arranged such that the spacing between the tines is substantially equal.

The basic cultivator attachment therefore comprises the frame 12 attached to the hitch pole together with the five S tines. The frame is mounted on the ground wheels which allow the cultivator to be raised and lowered by the pivotal action of the shaft 19. This simple cultivator attachment can be readily attached to the ATV vehicle for operation across the ground and can also be detached, disassembled and stored.

A number of accessories are also provided for the basic cultivator attachment as described above.

As shown in FIG. 2, the frame is supplemented by the addition of two attachments 14A and 14B each of which comprises a tubular member of the same cross section as the bars 13, 14 and 15 and an inner plate 14C welded to the end of the attachment bar. On the plate 14C is mounted a pair of U-clamps 14D which engage around a respective one of the rails so as to clamp the plate 14C on the outside surface of the rail with the attachment bar extending outwardly. At the outer end of each attachment bar is a further S tine 30. The length of the attachment bars 14A and 14B is arranged such that the S tines at the ends of the attachment bars are equidistantly spaced beyond the outermost S tines which are on the rear bar 15 at the ends 15A and 15B. The attachment bars 14A and 14B therefore can be supplied as an accessory for attachment to the basic frame if required to increase the width of the cultivator. The basic width of the cultivator is defined by the tines at the ends of the rear bar and in some cases the towing which has only sufficient power to pull that width of cultivator through the ground. If more power is available or if the soil conditions allow, the accessory provided by the attachment bars can be added.

A further attachment comprises a harrow bar 40. This comprises an elongate tube extending across the full width of the rear bar 15 on which is attached a plurality of harrow tines 41 which extend downwardly from the bar 40 to the ground in a conventional harrowing action. The bar 40 is attached to the frame by a pair of arms 41 which extend upwardly and forwardly beyond the rear tool bar 15 to a pair of upstanding posts 42 each carried on a respective one of the rails, 16, 17. The arms 41 are spring biased downwardly into contact with the rear edge of the rear bar 15 by a spring system 43. Each spring system comprises a pin 44 passing through a hole in the arm with the pin shaped in an arc surrounding the axis of a pivot pin 45 at the top of the arm. A spring 46 is wrapped around the pin 44 so as to be compressed between the upper side of the arm 41 and the underside of a cross pin 47 which holds the spring in place on the pin 44. The harrow attachment is therefore a simple device which can be readily mounted in place by insertion of the pins 45 holding the arms to the top of the post 42 and by mounting of the arms on the pins 44 with a cross pin 47 holding the spring in place. The harrow can therefore simply move upwardly and downwardly against the spring action.

Figure 5:
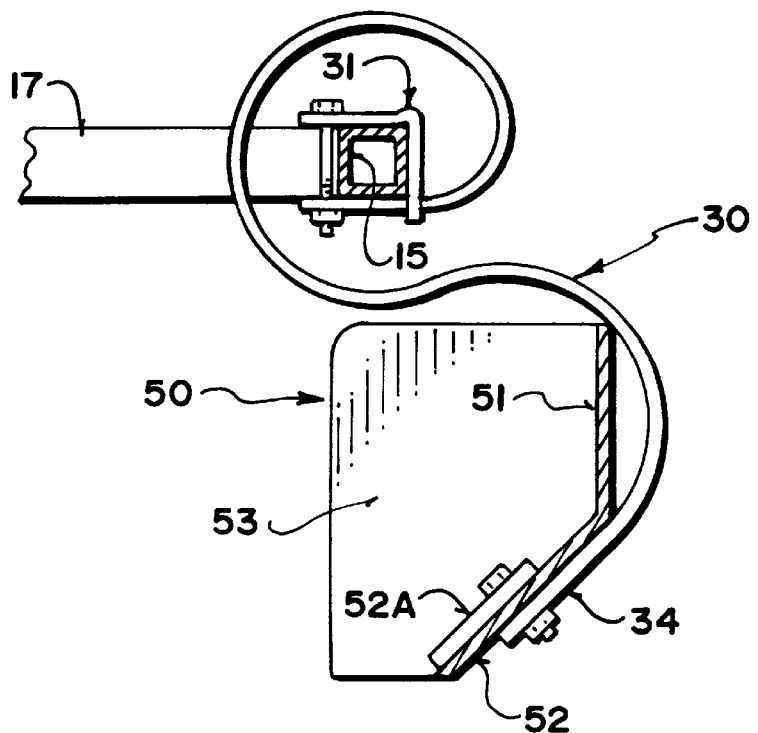
FIG. 5 is a vertical cross-sectional view through the scraper blade accessory of FIG. 4.
Figure 4:
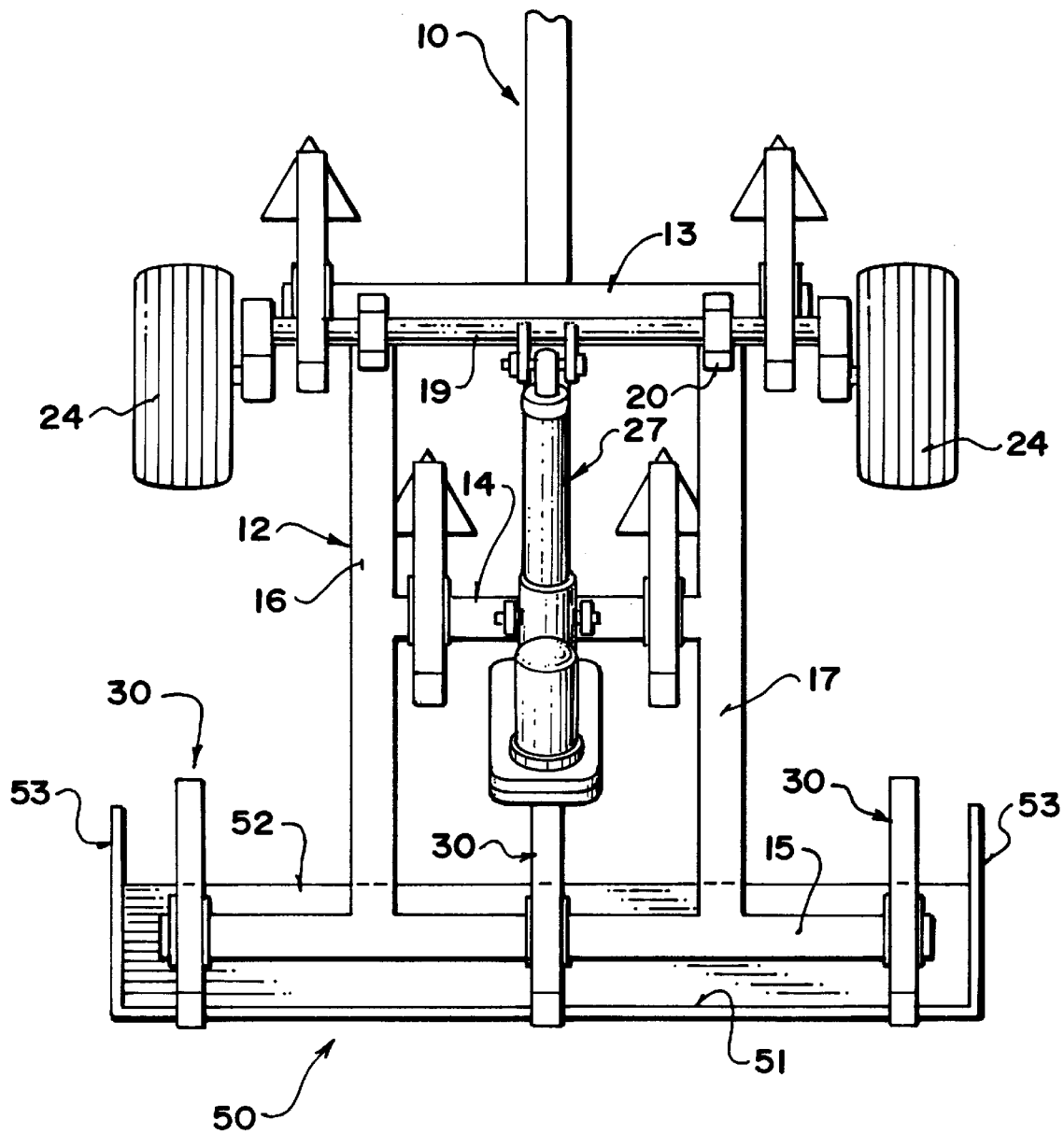
FIG. 4 is a top plan view of the cultivator of FIG. 1 showing the addition of a scraper blade accessory.

Turning now to FIGS. 4 and 5, there is shown a further accessory which can be used with the basic cultivator described above. This accessory comprises a land leveller blade generally indicated at 50 which is mounted on the rear tool bar 15 by use of the S tines 30 of that rear tool bar. The land leveller blade 50 comprises a vertical back wall 51, an inclined scraper wall 52 and a re-enforced plate 52A extending downwardly and forwardly from a bottom edge of the back wall 51. Two side walls 53 are connected by welding to the back wall and the scraper wall and extend forwardly therefrom to confine material within the area of the scraper blade to carry material forwardly in front of the rear wall and the scraper wall. The scraper wall includes two holes by which it is bolted to respective ones of the S tines 30. The scraper wall is arranged at an angle so that it is carried on the lower end 34 of the S tine and extends directly downwardly and forwardly therefrom. The cultivator thus acts as a land leveller in that the front four cultivator blades act to work the surface of the ground in front of the scraper blade and the scraper blade carries the work material forwardly in a levelling action.

Figure 6:
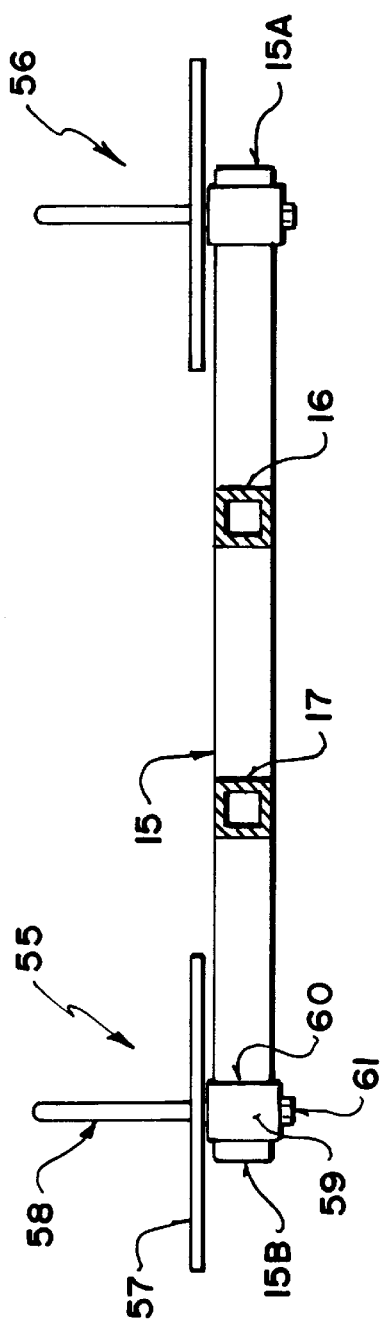
FIG. 6 is a vertical cross-sectional view showing the rear tool bar and a wire dispensing accessory attached thereto.

In FIG. 6 is shown a further accessory mounted on the rear tool bar 15. The further accessory comprises a pair of wire reels 55 and 56 each for carrying a reel of wire and for unrolling the wire as the frame is moved forwardly. In this accessory the cultivator tines can be removed or may simply be lifted away from the ground so as to be inactive. The reels 55 and 56 each comprise a flat circular disc 57 and a central vertical post 58. On an underside of the disc is mounted a collar 59 with an open side face 60 which can slide onto the free end 15A, 15B of the rear tool bar and can be clamped in place by a clamping bolt 61. Thus each reel is carried at the end of the rear tool bar with the post standing vertically upwardly therefrom.

Figure 7:
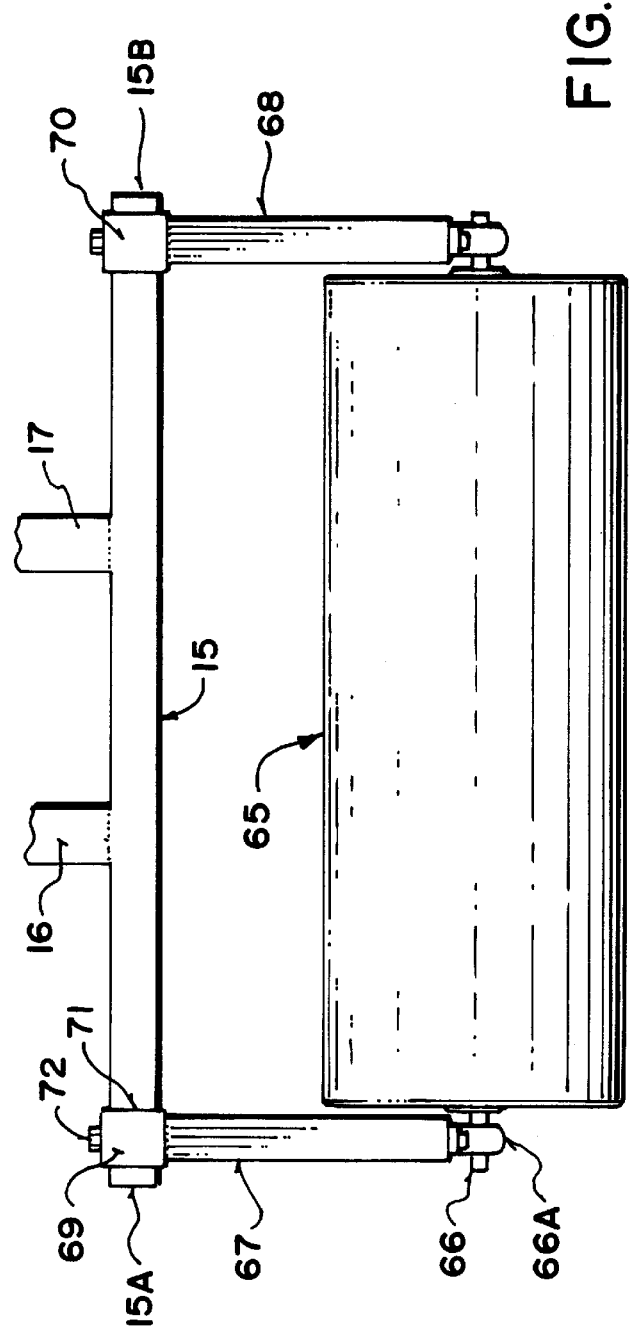
FIG. 7 is a top plan view of the rear tool bar of the cultivator showing the attachment of a roller accessory.

In FIG. 7 is shown a further accessory which comprises a roller 65 for rolling on the ground behind the rear tool bar 15. The roller 65 is carried on a shaft 66 attached to the ends of a pair of arms 67 and 68 by bearings 66A. The forward end of each arm is welded to a square collar 69, 70 which has an open mouth 71 slipped onto a respective end 15A, 15B of the rear bar 15. The collar is clamped in place by a bolt 72. The arms are therefore at a fixed angle relative to the collars and extend rearwardly and downwardly from the tool bar 15 and thus support the roller 65 at a fixed height difference relative to the tool bar 15. When the wheels are thus raised, the weight from the frame is applied to the roller and thus causes the roller to be applied with pressure to the ground in a rolling action. In the embodiment shown, the roller is smooth. A roller with a series of spikes can also be provided for aeration of the soil.

Figure 8:
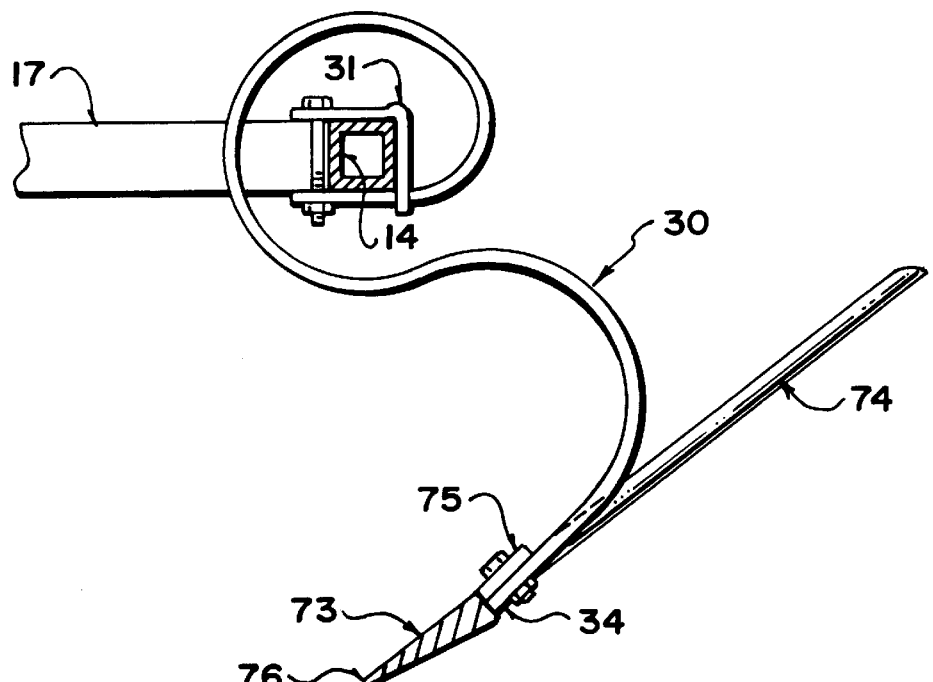
FIG. 8 is a side elevational view of potato digger accessory for the cultivator.
Figure 9:
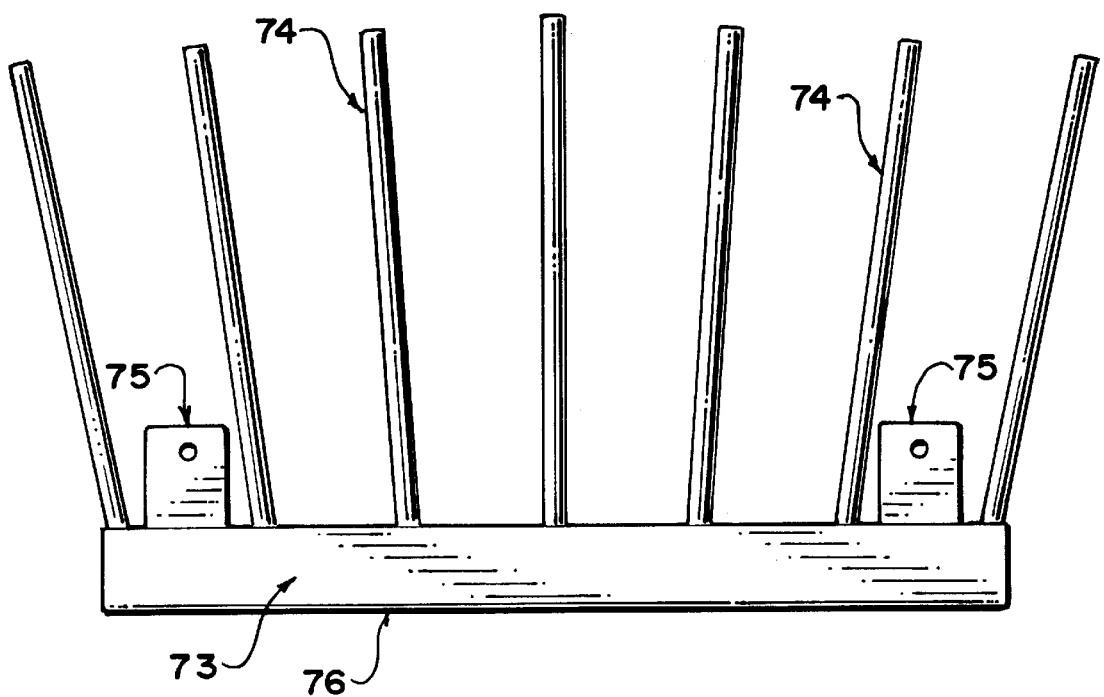
FIG. 9 is a top plan view of the potato digger of FIG. 8.

In FIGS. 8 and 9 is shown a further accessory used for digging potatoes. This accessory comprises a blade portion 73 in the form of a flat plate with a plurality of fingers or tines 74 extending upwardly and rearwardly from a rear edge of the plate. The plate carries a pair of rearwardly extending tabs 75. The spacing between the tabs is such that the tabs match the positions of the tines of the centre tool bar 14 so that with the sweeps removed the tabs 75 can be bolted to respective ones of the tines 30 to hold the blade 73 at an angle inclined upwardly and rearwardly from a front cutting edge 76 to the tines 74 at the rear edge. The blade 73 thus cuts into the ground in a row or hill of potato plants and the tines act to lift the potatoes up onto the top of the soil to allow separation from the soil and manual picking.

Figure 10:
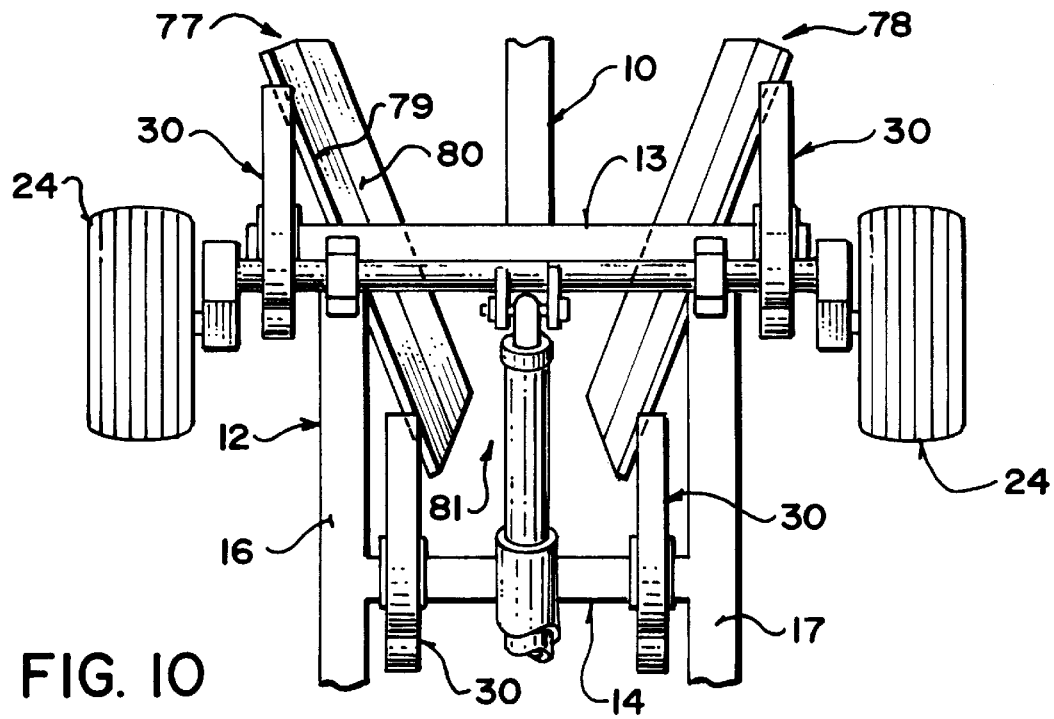
FIG. 10 is a top plan view of the cultivator including a hiller accessory.

In FIG. 10 is shown a further accessory in the form of a pair of hilling plates 77 and 78. Each of these comprises a generally vertical backplate 79 and a downwardly and forwardly inclined bottom plate portion 80. The plates 77 and 78 are arranged for attachment to the tines 30 of the front tool bar 13 and to the tines 30 of the tool bar 14. Thus each of the plates is inclined rearwardly and inwardly since its forward end is attached to the tine 30 spaced outwardly of the rail 16 and its rear end is attached to the tine 30 of the tool bar 14 which is spaced inwardly of the rail 16. The two plates therefore act to scrape the ground surface and carry the soil so scraped inwardly into a hill in the space 81 between the rear ends of the two plates.

Figure 11:
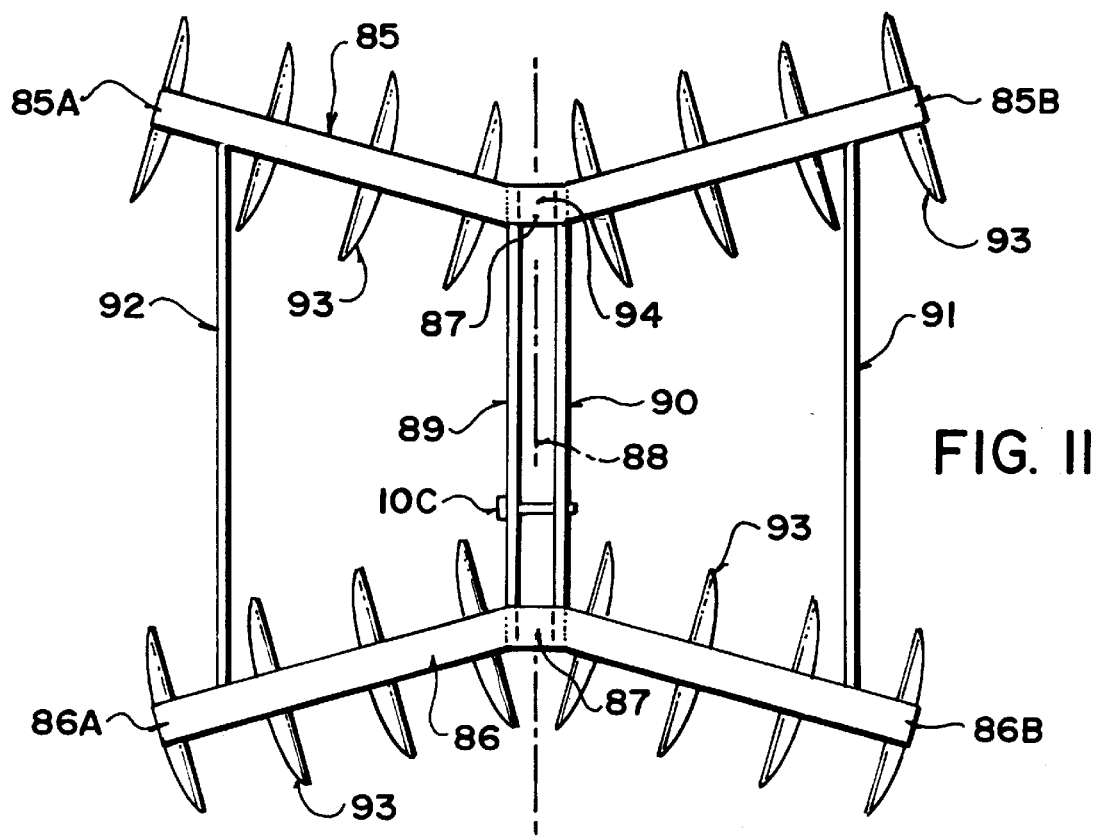
FIG. 11 is a top plan view of a disker accessory for use with the cultivator of FIG. 1.

In FIG. 11 is shown a further accessory in the form of a discer. This accessory comprises a pair of tool bars 85 and 86 forming front and rear tool bars respectively. Each tool bar includes a central apex 87 on a center mounting line 88. The rear tool bar 86 is inclined so that the apex is forward and the trailing ends 86A and 86B trial rearwardly from the apex. The front tool bar 85 is reversed so that the outside ends 85A and 85B are leading relative to the apex 87. The tool bars are connected by a pair of parallel rails 89, 90 on respective sides of the center line 88. The tool bars are also connected by outer rails 91 and 92 adjacent the outer ends of the tool bars. Thus the rails connect the tool bars and form a rigid structure lying in a common horizontal plane.

Each of the tool bars carries a plurality of discer elements 93 which are carried in conventional manner on shafts supported from the tool bars and spaced downwardly from the tool bars so that the discer elements engage the ground underneath the tool bars. The discer elements are dished in conventional manner. The discer elements on the front tool bar are dished so that on each side of the centre line 88 they face outwardly. The disc elements on the rear toolbar are arranged so that they face inwardly from the centre line 88. Thus the discer elements on each side are opposed as they move through the ground. Thus the discer elements are balanced so that there is no tendency of the discer to move sideways. Underneath the front tool bar 85 and attached to the front of the rails 89, 90 is a collar 94. In use of the discer accessory, the tines are removed from the tool bars 13, 14 and 15. The hitch pole is released from the collars 10A and 10B and the hitch pole pulled out for most collars. The hitch pole is then inserted through the collar 94 and the hitch pole lies between the two rails 89 and 90. The collar 10A is then positioned just behind the collar 94 and between the two rails 89 and 90. Similarly the collar 10B is positioned partway back between the rails 89 and 90 so that the pin 10C can be inserted through holes in the rails 89 and 90 and through the holes in the collar 10B thus attaching both frames to the hitch pole. The discer frame is thus supported by the wheels underneath the frame 12 on the hitch pole 10. The wheels can be operated as previously described to raise and lower the discer frame.

Other accessories can also be provided for attachment to the base frame and for transportation with the cultivator frame behind the ATV type vehicle.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A cultivator comprising:
   a cultivator frame including a plurality of horizontal parallel tool bars and a pair of rails interconnecting the tool bars to hold the tool bars at right angles to a direction of forward movement of the frame;
   each tool bar having mounted thereon a plurality of shanks each for carrying a ground working tool;
   a pair of ground wheels mounted on the frame for carrying the frame in movement across the ground;

the ground wheels being mounted on a support member mounted for pivotal movement relative to the frame and including an actuation arrangement operable between the support member and the frame for raising a height of the frame relative to the ground;

and a hitch for connecting to the vehicle for applying a towing force from the vehicle to the cultivator, the hitch extending forwardly from a forwardmost one of the tool bars;

said actuation arrangement including a lever and an electric actuator for receiving electric power from the vehicle for operating said lever;

the support member including a horizontal shaft mounted on the rails of the frame at the forwardmost one of the tool bars and extending outwardly relative to the rails to a respective end of the shaft arranged beyond a respective end of the forwardmost one of the tool bars;

each end of the shaft carrying a respective one of the ground wheels such that the ground wheels are located outwardly of the ends of the forwardmost one of the tool bars and outwardly of the rails;

a rear one of the tool bars having a length greater than that of the forwardmost one of the tool bars so as to extend to a position rearwardly of a respective one of the ground wheels.

2. The cultivator according to claim 1 wherein there are three tool bars including the forwardmost tool bar, an intermediate tool bar and the rear tool bar and wherein the actuator is mounted on an intermediate one of the tool bars and extends therefrom to the lever.

3. The cultivator according to claim 2 wherein the intermediate one of the tool bars is of a shortest length and is located wholly between the rails, wherein the forwardmost one of the tool bars is of an intermediate length and wherein said rear one of the tool bars is of the longest length.

4. The cultivator according to claim 3 wherein the rear tool bar has ends thereof projecting outwardly from the rails for receiving thereon an attachment collar of an accessory.

5. The cultivator according to claim 4 wherein there is provided a ground roller for rolling over the ground behind the rear tool bar, the roller having a pair of towing arms each at a respective end of the roller and extending forwardly therefrom, each towing arm having a collar at a forward end thereof with an open mouth facing to one side thereof for engaging onto a respective end of the rear tool bar.

6. The cultivator according to claim 2 wherein there is provided a pair of extension arms, each having a shank thereon at an outer end thereof and each having a clamping assembly at an inner end thereof arranged for attachment to an outer side of a respective one of the rails at said intermediate one of the tool bars so as to define an extension of the intermediate tool bar outwardly of the respective rail.

7. The cultivator according to claim 1 wherein there is provided a hiller attachment comprising a pair of plate members attached to the shanks of a forward one of the tool bars and to the shanks of a rearward one of the tool bars so as to be carried thereby at an angle to a forward direction.

8. The cultivator according to claim 1 wherein there is provided a potato digger attachment comprising a transverse plate attached across two shanks of one of the tool bars so as to lie at right angles to a forward direction and a plurality of separator bars mounted on the plate and diverging rearwardly and outwardly therefrom.

9. The cultivator according to claim 1 wherein the electric actuator comprises a cylindrical housing mounted in a clamping sleeve for adjustment of the cylindrical housing longitudinally of the sleeve, the sleeve being mounted on the frame for pivotal movement about an axis transverse to the sleeve.

10. A cultivator comprising:

a cultivator frame including at least one horizontal tool bar and a pair of side rails to hold the tool bar at right angles to a direction of forward movement of the frame;

said at least one tool bar having mounted thereon a plurality of shanks each for carrying a ground working tool;

a pair of ground wheels mounted on the frame for carrying the frame in movement across the ground;

the ground wheels being mounted on a support member mounted for pivotal movement relative to the frame and including an actuation arrangement operable between the support member and the frame for raising a height of the frame relative to the ground;

a hitch for connecting to the vehicle for applying a towing force from the vehicle to the cultivator;

wherein there is provided a disker attachment for the cultivator, the disker attachment including a longitudinal receptacle portion, a front pair of disk support arms mounted on and extending outwardly from the receptacle portion and a rear pair of disk support arms mounted on and extending outwardly from the receptacle portion, the receptacle portion being arranged to receive a central pole of the cultivator therein.

11. The cultivator according to claim 10 wherein the central pole comprises a hitch pole and wherein the receptacle portion includes a collar thereon into which the hitch pole can slide.

12. The cultivator according to claim 11 wherein the frame includes a first collar through which the hitch pole slides and a second collar into which the hitch pole engages, the hitch pole being connected to at least one of the collars by a connection pin and wherein the collar of the receptacle portion slide onto the hitch pole forwardly of the first collar.

13. A cultivator comprising:

a cultivator frame including at least one horizontal tool bar and a pair of side rails to hold the tool bar at right angles to a direction of forward movement of the frame;

said at least one tool bar having mounted thereon a plurality of shanks each for carrying a ground working tool;

a pair of ground wheels mounted on the frame for carrying the frame in movement across the ground;

the ground wheels being mounted on a support member mounted for pivotal movement relative to the frame and including an actuation arrangement operable between the support member and the frame for raising a height of the frame relative to the ground;

a hitch for connecting to the vehicle for applying a towing force from the vehicle to the cultivator;

wherein there is provided a pair of wire support members for dispensing wire from the frame, each wire support member comprising a horizontal support plate, a vertical post standing upwardly from the horizontal support plate and an attachment collar mounted underneath the horizontal support plate with an open mouth facing horizontally for engaging onto a respective exposed end of said at least one tool bar.

14. A cultivator comprising:

a cultivator frame including at least one horizontal tool bar and a pair of side rails to hold the tool bar at right angles to a direction of forward movement of the frame;

said at least one tool bar having mounted thereon a plurality of shanks each for carrying a ground working tool;

a pair of ground wheels mounted on the frame for carrying the frame in movement across the ground;

the ground wheels being mounted on a support member mounted for pivotal movement relative to the frame and including an actuation arrangement operable between the support member and the frame for raising a height of the frame relative to the ground;

a hitch for connecting to the vehicle for applying a towing force from the vehicle to the cultivator;

wherein there is provided a harrow bar mounted on the frame so as to be carried rearwardly of a rear one of said at least one tool bar, the harrow bar comprising a horizontal support bar having a plurality of harrow tines extending downwardly therefrom, a pair of support arms extending upwardly and forwardly from the support bar, a pair of support posts mounted on the frame each having a top end for receiving a respective one of the support arms, each arm being connected to the top end of the respective support post for pivotal movement about a pivot axis, and a spring biasing assembly providing downward spring force on the arms, the spring biasing assembly comprising a pair of pins attached to a rear one of said at least one tool bar and extending upwardly therefrom, the pins being curved about said pivot axis and each pin carrying a spring having an upper end engaging a removable stop and a lower end engaging the respective arm.

15. A cultivator comprising:

a cultivator frame including a plurality of horizontal parallel tool bars and a pair of rails interconnecting the tool bars to hold the tool bars at right angles to a direction of forward movement of the frame;

each tool bar having mounted thereon a plurality of shanks each for carrying a ground working tool;

a pair of ground wheels mounted on the frame for carrying the frame in movement across the ground;

the ground wheels being mounted on a support member for pivotal movement relative to the frame and including an actuation lever operable for raising a height of the frame relative to the ground;

a hitch connected to the cultivator and extending forwardly therefrom to a hitch connection for connecting to the vehicle;

wherein a rear tool one of the tool bar has rectangular ends thereof projecting outwardly from the rails to the sides and defining an exposed end of the tool bar;

and an accessory mounted on the rear tool bar including a pair of forwardly extending arms, each arm having a rectangular sleeve attached to a forward end thereof at right angles thereto and engaged over a respective one of the exposed ends so as to hold the arms extending rearwardly from the rear tool bar at a predetermined angle relative thereto.

* * * * *